United States Patent [19]

Prucnal et al.

[11] Patent Number: 4,887,879
[45] Date of Patent: Dec. 19, 1989

[54] FIBER OPTIC TAP

[75] Inventors: Paul R. Prucnal, Princeton, N.J.; Stuart D. Elby; Edward E. Harstead, both of New York, N.Y.

[73] Assignee: The Trustees of Columbia University in the City of New York, New York, N.Y.

[21] Appl. No.: 147,447

[22] Filed: Jan. 25, 1988

[51] Int. Cl.⁴ ............................................. G02B 6/26
[52] U.S. Cl. .................................................. 350/96.15
[58] Field of Search ............... 350/96.15, 96.16, 96.29, 350/96.30

[56] References Cited

U.S. PATENT DOCUMENTS

| | | | |
|---|---|---|---|
| 4,557,550 | 12/1985 | Beals et al. | 350/96.16 X |
| 4,557,552 | 12/1985 | Newton et al. | 350/96.19 X |
| 4,586,783 | 5/1986 | Campbell et al. | 350/96.15 |
| 4,741,585 | 5/1988 | Uken | 350/96.18 X |
| 4,781,428 | 11/1988 | Epworth et al. | 350/96.15 X |

Primary Examiner—William L. Sikes
Assistant Examiner—Phan T. Heartney
Attorney, Agent, or Firm—John P. White

[57] ABSTRACT

A passive fiber optic tap for a single mode optical fiber is disclosed which utilizes cladding modes induced within the fiber by a microbender. The fiber has a symmetrically circular hour glass shaped notch for tapping radiation from the cladding mode and a detector converts light into an electrical signal. Large tapping ratios, low excess loss and structural compatibility with integrated circuity is obtained.

17 Claims, 3 Drawing Sheets

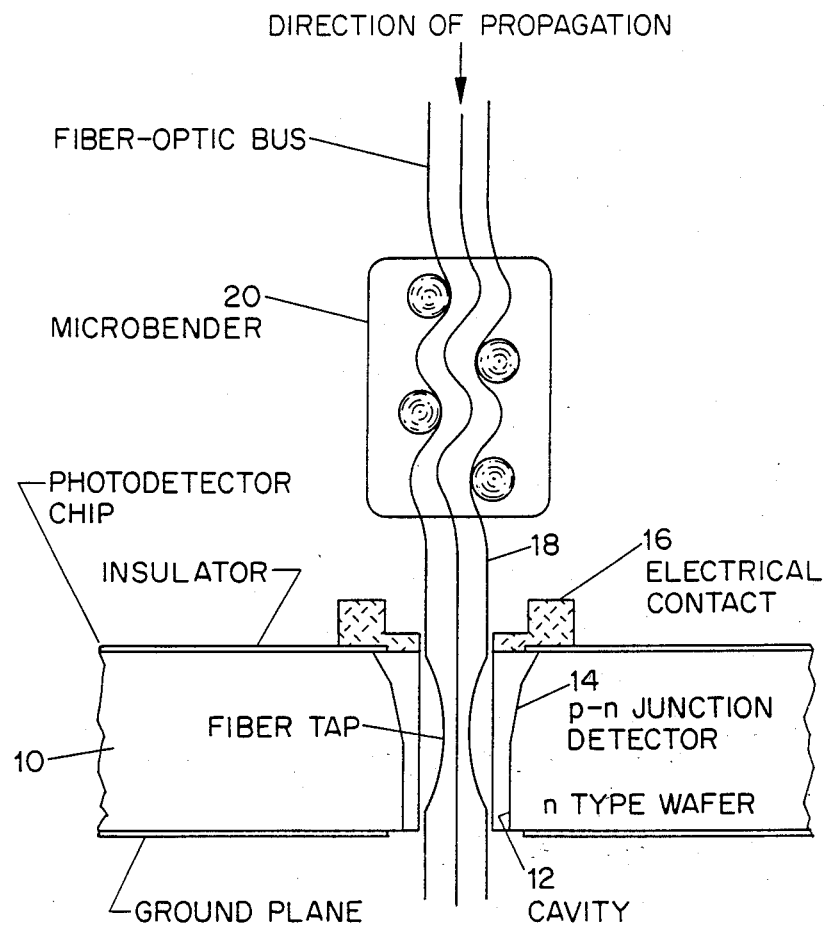
FIG. 1
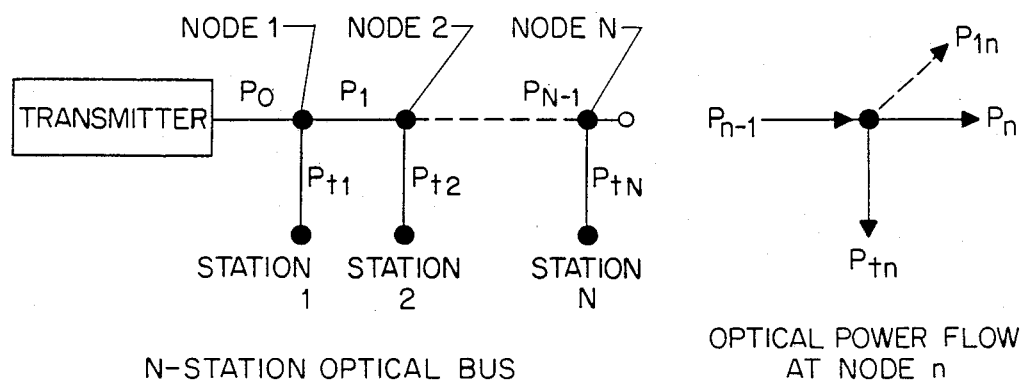
N-STATION OPTICAL BUS
FIG. 2A
OPTICAL POWER FLOW AT NODE n
FIG. 2B

FIBER OPTIC TAP

BACKGROUND OF THE INVENTION

Funding for work on this invention was received from the National Science Foundation ERC under Award No. CDR-84-21402. The U.S. government may have rights in this invention.

The present invention relates to fiber optic taps and more particularly to a passive optical tap utilizing cladding modes in a single mode fiber to optically couple the fiber to a photodetector.

Within this application several publications are referenced by arabic numerals within parentheses. Full citations for these references may be found at the end of the specification immediately preceding the claims. The disclosures of these publications in their entireties are hereby incorporated by reference into this application in order to more fully describe the state of the art to which this invention pertains.

There are many applications in which small amounts of light need to be tapped from an optical fiber in order to broadcast to a large number of nodes, including optical clock distribution in synchronous optical local area networks (LAN's) and in very large scale integrated (VLSI) multiprocessor systems. The utility of such a light tap is often measured, in part, by its range of tapping ratios and its excess loss. These parameters determine the maximum number of stations that can be concatenated before signal regeneration by a signal repeater is required.

Commercially available passive optical taps, such as fused couplers, often couple light from one fiber to another through a thin cladding barrier. Single-mode optical taps exhibit tapping ratios as large as 20 dB and excess losses on the order of 0.1 dB, but these excess losses are fixed at some value which is not related to the tapping ratio, so that total excess losses of all taps are related to the number of nodes N. These characteristics are only adequate for the series connection of approximately 100 (i.e., N=100) taps or nodes in a typical optical system without repeaters, limited primarily by sensitivity constraints of optical receivers.

Several arrangements have been proposed which directly tap core modes by removing cladding and bringing a high index medium into contact with the exposed core, but these have involved multimode fibers. In one case, a high index medium is brought into direct contact with the exposed core of a 200/230 um multimode fiber, resulting in a 40 dB tapping ratio and less than 0.1 dB excess loss.(1) In another case, a hole in the cladding of a 50/125 um multimode fiber is filled with a high index medium.(2)

No satisfactory arrangement presently exists for passively tapping single mode optical fiber without resulting in significant excess loss, thereby significantly limiting the number of taps in an optical system or fiber optic bus for a repeaterless system.

SUMMARY OF THE INVENTION

The present invention relates to a passive optical tap for a single-mode optical fiber for optically transferring optical information from a source optically connected to said fiber to a light detector. The optical tap comprises means for inducing cladding modes within the fiber, detector means for converting light into an electrical signal, and means for optically coupling the fiber to said detector means to couple energy from the induced cladding modes to the detector means.

The means for optically coupling may comprise a reduced diametrical notch formed in the fiber having a circularly symmetrical shape. In a preferred embodiment, the fiber has a glass core diameter of about 4 um (to be used for light having a wavelength of 830 nm) and an outside (cladding) diameter of about 80 um, with a notch depth of about 20 um. The detector means for converting light into an electrical signal may be an integrated photodetector formed of a p-n junction. In a preferred embodiment, a semiconductor wafer has a cavity etched from one surface of the wafer to another surface of the wafer, and the p-n junction is formed on the inside surface of the cavity.

The means for inducing cladding modes into the fiber may comprise a microbender, such as a mode-scrambler which induces cladding modes and causes redistribution of the cladding modes into a steady state modal distribution. The microbender may include means for adjusting the extent of microbend in the fiber to adjust the tapping ratio of the optical tap.

The present invention further concerns a method of making a passive optical tap for a single mode optical fiber. The method comprises etching a cavity in a semiconductor wafer with a laser beam to form a passage from one surface of the wafer to another surface of the wafer. A p-n junction is then formed on the inner surface of the passage to create a detector capable of converting light into an electrical signal. An electroconductive metal is then deposited on the surface of the wafer around the opening of the cavity and in electrical contract with the p-n junction. A notch is formed in a single mode optical fiber having an outer buffer by removing a cylindrical section of buffer from the fiber for a length less than the length of the passage. The notched fiber portion is then submersed into an etchant solution to remove cladding from the fiber and to form a circularly symmetrical notch. The fiber is then inserted into the passage of the wafer so that the notch fiber portion is aligned in the center of the length of the passage. The optical fiber is then affixed to the semiconductor wafer.

BRIEF DESCRIPTION OF THE FIGURES

FIG. 1 is a schematic cross-sectional view of a passive optical tap embodying the present invention in a particular form.

FIG. 2A is a flow diagram showing the topology of an N-station optical bus.

FIG. 2B is a diagram showing the optical power flow at a typical node N of FIG. 2A.

DETAILED DESCRIPTION OF THE INVENTION

Figure 3:
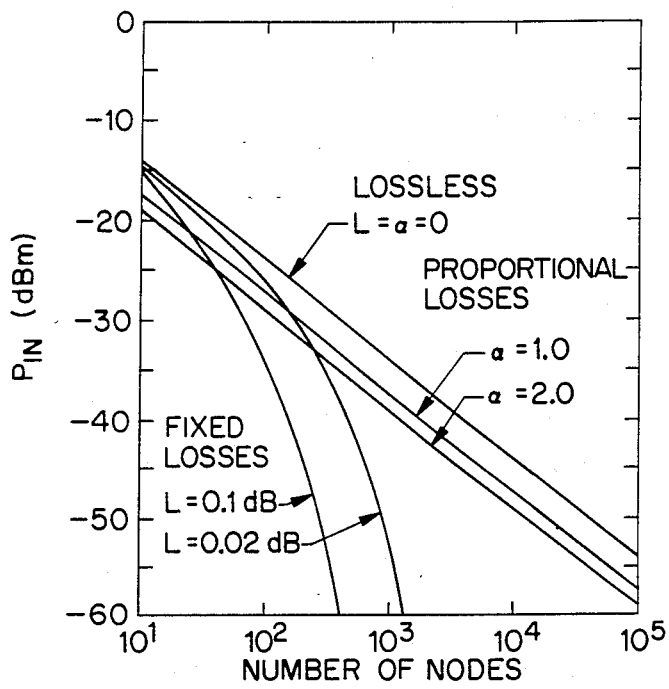
FIG. 3 is a graph showing the functional relationship between loss and the number of nodes N for a particular fiber for a fixed loss case, proportional loss case, and theoretical lossless case, assuming OdBm enters the first node.

Referring in more particularity to FIG. 1, the present invention contemplates a passive optical tap for a single-mode optical fiber which comprises a semiconductor wafer 10 of n-type material, preferably silicon, having greater than 3 ohm-cm with (100) orientation and being 250 um in thickness. A passage well or cavity 12 is formed from one surface of the wafer 10 to the other surface by means of a UV driven dry photolytac etching process utilizing a focused laser beam produced by an AR+ laser (350 nm line) to induce photodissociation of gaseous $Cl_2$ (3). The photodissociated $Cl_2$ removes silicon reactively, forming volatile silicon chloride products. To produce a passage which can accommodate the fiber's 80 um cladding diameter, the wafer is held at room temperature in 450 Torr of $Cl_2$ and irradiated for six minutes with a one watt laser beam focused to a 2 um beam waist. The diameter of the passage is approximately 120 um.

Once the passage is etched, the remaining processing is compatible with standard integrated circuit fabrication. (4) A p-n junction detector 14 is formed inside the passage by spinning boron-containing polymer onto the surface of the wafer formed by a high temperature drive-in. Electrical contact is made to the junction at the top of the passage by maskless evaporation of aluminum to form electrical contact 16.

Optical fiber 18, which is a Corning single mode fiber with 4 um glass core, 80 um glass cladding, a 250 um plastic buffer, was prepared by mechanically removing under a microscope an approximately 125 um cylindrical section of the plastic buffer. The fiber was then submersed in a buffered HF etchant solution. The plastic buffer acted as a mask so that only the section of fiber with exposed cladding was etched, along with areas of the fiber adjacent to the removed plastic buffer section. The depth of the notch was controlled by the length of the submersion time, with a 30 minute submersion time resulting in a notch depth of approximately 20 um. After etching, the plastic buffer was chemically removed with methylchloride. The characteristic taper of the notch is due to the diffusion of etchant from the exposed section of cladding to cladding underneath the plastic buffer, to thereby form a circularly symmetrical notch having an hour glass shape.

The semiconductor wafer containing the detector cavity is then mounted on a standard integrated circuit package, which in turn is connected to a micromanipulator at an adjustable tilt angle to facilitate the fiber insertion. The silicon chip containing the detector cavity is mounted beneath an 80× microscope, on the x-y stage of the probe station.

The fiber containing the fiber tap was held in a vacuum chuck mounted on a 3-axis micromanipulator such that the vacuum chuck supported the fiber just above the fiber tap. The fiber was then threaded through the detectors cylindrical passage and the fiber tap was positioned near the top surface of the semiconductor wafer. The vacuum chuck was disengaged and replaced with a Newport FM-1 mode scrambler 20, which provided adequate mechanical support for the fiber, at a point 4 cm above the wafer. Mechanically chopped 830 nm light from a laser diode was injected into the other end of the fiber. Microbends were induced in the fiber with the mode scrambler, and the notched section of the fiber was positioned within the passage of the semiconductor wafer for maximum coupling with the detector by monitoring photocurrent on an oscilloscope which received, through its 1 M ohm input, the anode and cathode of the detector, while the fiber was moved in relation to the semiconductor wafer. When the maximum coupling was achieved, the fiber was affixed to the wafer with epoxy. The size of the glass core in the fiber for a particular application is selected in dependence on the wavelength of light used in the application. Accordingly, a fiber having a glass core of 4 um is used for a wavelength of 830 nm, whereas a glass core of 9 um would be used for a wavelength of 1300 nm, for example. The wafer may of course be of another semiconductor such as GaAs (gallium arsenide), in which case the electroconductive metal could be AuGe (gold germanium), to compliment the substrate material.

Experimental Results

An optical power meter was positioned at the downstream end of the fiber (optical bus) to monitor the optical power remaining on the fiber after the tap. The fiber end face was covered with index matching gel to prevent back reflections which could influence the measurements.

Figure 5A:
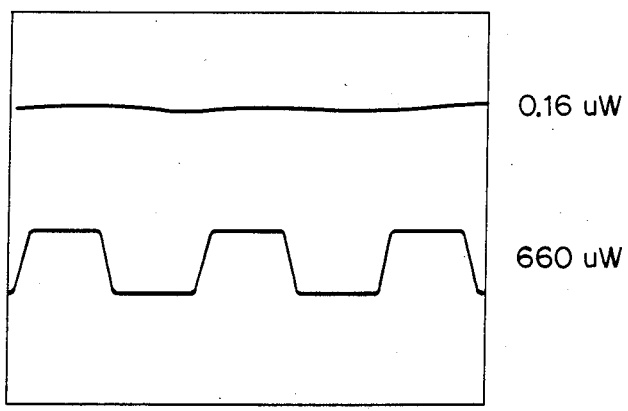
FIGS. 5A–5C show graphs of experimental results for the different microbender pressures. The top trace in each graph is the tapped signal measured directly across 1 M ohm, which large resistance is responsible for the rounding of the waveform, while the bottom trace in each graph is the untapped signal which continues along the fiber.
Figure 5B:
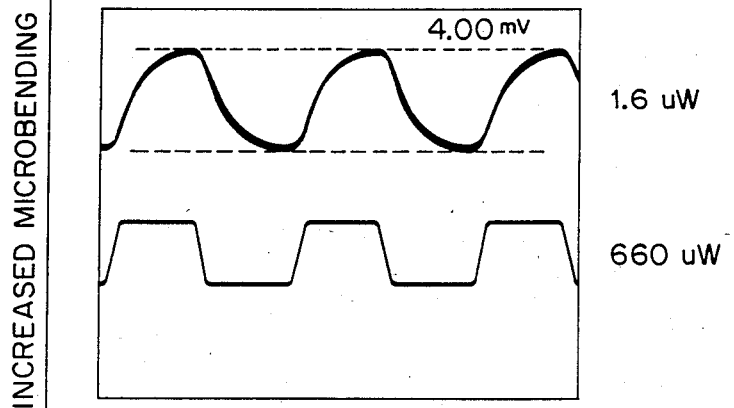
Figure 5C:
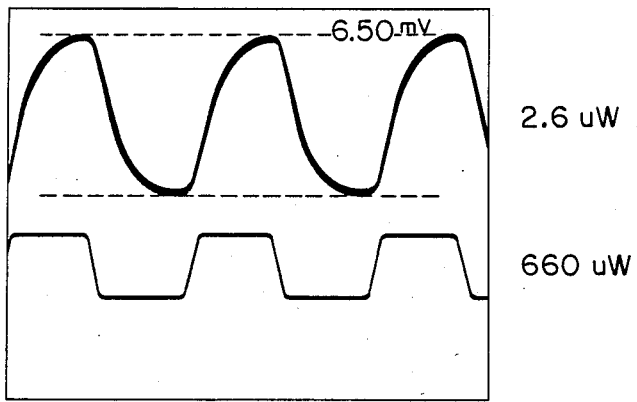

The mode-scrambler was adjusted so as to apply minimal microbending to the fiber, and the resulting fiber bus signal measured at the power meter was 660 uW with a variation of ±1%. The tapped signal was 0.4 nA, or an optical power of 0.16 uW, which corresponds to a tapping ratio of 36 dB (FIG. 5A). This low level of power was just observable above the 0.1 uW noise equivalent power. As microbending was increased, the tapped signal correspondingly increased without a measurable difference in bus output. FIGS. 5B and 5C show the tapped signals (1.6 uW and 2.6 uW, respectively), and the bus signals (660 uW for both cases) for increasing amounts of microbending corresponding to tapping ratios of 26 dB and 24 dB, respectively.

Actual measurements of excess loss were hindered by the large uncertainty in the transmitted (bus) power, i.e., ±6.6 uW. A worst case estimate, however, can be made. Since no excess loss was observed, the maximum value of lost power can be no greater than the difference between the power uncertainty (13.2 uW) and the tapped power (2.6 uW). Hence, the lost power may be as large as 10.6 uW. This corresponds to a maximum loss (defined as the fraction of power input which is lost) of 1.62% (0.07 dB loss), which is on par with the best commercially available taps.

The magnitude of the microbending controls the amount of power transferred from the core to the cladding. In this way the tapping ratio may be continuously adjusted. When the microbending is small, a high impedance tap is obtained. Its properties of low loss and high impedance make the integrated fiber-optic tap an appropriate choice for systems which distribute optical signals to a large number of nodes on a repeaterless single-mode fiber bus.

Discussion

The underlying principles which permit the integrated fiber-optic tap to transfer optical power from the core to the cladding, and to remove this power in a controlled, low-loss fashion, are described below. These principles give rise to certain functional features which are unique to this integrated fiber-optic tap. In particular, a proportionality exists between excess loss and tapping ratio.

Single-mode fiber may be modelled as two superimposed waveguides: a low-loss single-mode waveguide defined by the core radius and a high-loss multimode waveguide defined by the cladding radius. The presence of the core has negligible effect upon the guiding properties of the cladding provided core radius is much less than the cladding radius, and the normalized difference between the core and cladding index is much less than 1.(5)

The higher order cladding modes are substantially lossier than the guided core mode, due to the poor optical quality of the exterior cladding interface. High-loss modes are uncoupled from the low-loss modes according to coupled power theory (6), hence the cladding and core modes are uncoupled in a single-mode fiber. However, when the fiber is deformed, the losses of the core and cladding modes are comparable. As a consequence, power is coupled into the cladding.(5,7)

The fraction of optical power in the core coupled into the cladding is a function of the magnitude of the deformation and length over which coupling occurs.

The proposed device taps cladding modes, therefore the amount of optical power available for tapping is equal to the power coupled into the cladding.

Severe deformation of the fiber results in coupling of cladding modes to radiation modes, which contribute to the excess loss of this device. Therefore, the fiber should be deformed in a way that maximizes the core to cladding coupling while minimizing the cladding to radiation coupling. Experimental results (8) indicate that deformations applied via microbending fulfill this requirement. However, the poor optical quality of the cladding's outer interface results in some loss to radiation modes. The fraction of optical power in the cladding, Lr, which is radiated and lost in this manner is related to the intrinsic loss due the poor optical quality of the cladding-air interface expressed in dB/cm, and the distance, in cm, between the point where cladding modes are induced by microbending and the point where they are tapped. Radiation loss Lr represents one source of loss in the integrated fiber-optic tap, and results in a decreased cladding power.

Radiation losses are reduced in the integrated tap structure by minimizing the distance between the point where cladding modes are induced and where they are tapped. Ideally, this distance should be zero; that is, the cladding modes should be induced at the tap itself. However, mechanical constraints dictated by the photodetector and microbender structures usually prevent this.

Light is removed from the cladding at the fiber tap, which is circularly symmetric notch etched into the cladding. The notch causes most of the remaining optical power traveling in the cladding to be radiated. The transfer of power from the cladding modes to radiation modes may be described in two ways: rays which impinge upon the tapered edge of the notch are removed as described by Snell's law, and the decreased cladding radius in the notch supports fewer modes. In any event, the result is the preferential removal of the higher order cladding modes.

Another form of loss intrinsic to the integrated fiber-optic tap results from cladding power not removed at the notch. Because the notch radius, is greater than the core radius, some of the cladding power will continue to propagate beyond the notch, and will be eventually lost as radiation modes. The fraction of optical power in the cladding entering the notch which is not removed by the notch, $L_p$, is a monotonically increasing function of radius provided core radius is less than notch radius which is less than cladding radius.

If the radius at the notch were allowed to equal the radius of the core, all of the cladding power entering the notch would be tapped and the loss of optical power of the notch would equal zero. Although this would improve device performance with respect to loss, it would likely introduce a significant increase in fabrication complexity. When the notch radius approaches the radius to which the core mode's evanescent field extends into the cladding, tapping occurs by evanescent coupling to the core power as well as radiative coupling to the cladding power. Because the evanescent field decreases exponentially with radius, tapping both core and cladding power results in higher sensitivity to variations in the notch radius than when only cladding power is tapped. Therefore, notch radii which are less than the penetration radius of the evanescent field impose stricter tolerances upon the fabrication of the notch.

To illustrate the significant effect that the two intrinsic loss mechanisms have upon the operation of the integrated fiber-optic tap, the loss parameters will be used to predict the macroscopic operating parameters of such a device. The total optical power lost, $P_1$, due to the two intrinsic loss mechanisms is:

$$P_1 = CP_{in}(L_r + (1 - L_r)L_p),$$

where C=the fraction of optical power in the core coupled to the cladding, and $P_{in}$=initial optical power guided by the core.

Clearly, the sum of the lost and tapped power must equal the power coupled into the cladding. The total power tapped, $P_t$, is then:

$$P_t = CP_{in}(1 - L_r)(1 - L_p).$$

A more meaningful definition of overall excess loss is the fraction of initial optical power which is lost:

$$L = C(L_r + (1 - L_r)L_p).$$

Likewise, the total tapping ratio, T, may be expressed as the fraction of initial optical power which is tapped:

$$T = C(1 - L_r)(1 - L_p).$$

Combining these expressions yields:

$$L = aT,$$

where $a = (L_r + (1 - L_r)L_p)/(1 - L_r)(1 - L_p)$.

Note that both L and T are directly proportional to C, therefore the loss and tapping ratio may be controlled by microbending. As C is varied, the modal power distribution within the cladding remains constant provided the coupling between the individual cladding modes has achieved a steady state distribution.(9) A constant modal distribution guarantees that $L_p$, $L_r$, and consequently a remain constant with varying C; that is, loss is directly proportional to tapping ratio. To obtain a steady state modal power distribution, a mode-scrambler is used as the microbender. A mode-scrambler not only induces cladding modes, but causes the redistribution of these cladding modes into a steady state distribution.

The advantages of the fiber optic tap according to the invention become apparent when the performance of a system using the tap is quantified. For these calculations, a repeaterless linear optical bus with N nodes is assumed (FIG. 2a).

Bus power entering node n from the previous node is $P_{n-1}$. At each node a fraction $T_n$ of this bus power is tapped, and a fraction $L_n$ is lost (FIG. 2b). Bus power entering the next node is therefore $$P_n = P_{n-1}(1 - L_n - T_n),$$

and the tapped power at station n is $$P_{tn} = P_{n-1} T_n.$$

Assuming $T_n$ is identical for all nodes ($T_n = T$), the minimum tapped power will be at the last node, N. This will determine the number of receivers (for a given sensitivity) that can be supported by the bus: $P_{tN}$, the equation for the tapped power at the last node ("tapped power equation" referred to later), is:

$$P_{tN} = P_0(1 - L - T)^{N-1} T.$$

Here, $P_0$ is the initial power injected into the bus, N is the total number of nodes, T is the tapping ratio, and L is the node fractional loss. Fiber attenuation, connector losses, and splice losses are ignored. (For applications such as VLSI optical clock distribution this is expected to be realistic).

Bus optimization by equating the power tapped at each node, rather than by equating the tapping ratio at each node as we have done, will result in a bus which can support more nodes for a given injected power. However, our intention here in this analysis is to highlight the differences between conventional taps and the integrated fiber-optic tap, not to design the most efficient bus, and the assumption of equal tapping ratios results in expressions which are much more illustrative.

$P_{tN}$ can be maximized with respect to the tapping ratio. Consider an ideal bus, i.e., a bus comprised of lossless taps. Taking the derivative of this latter equation with $L = 0$, and setting this expression equal to zero yields an optimal value for T:

$$T_{opt} = 1/N.$$

Therefore, the maximum value for $P_{tN}$ is:

$$[P_{TN}]_{opt} = P_0(1 - 1/N)^{N-1}/N$$

or in dB, $$[P_{tN}]_{opt}(dBm) = P_0(dBm) + (N-1)10log(1 - 1/N) + 10log1/N.$$

The first term on the right hand side of this expression is the injected power, the second represents the power tapped at the previous N−1 nodes, and the third is the tapping ratio. For real taps, the value of $T_{opt}$ is sensitive to the loss mechanism, as demonstrated below.

Case 1. Assume that the fractional losses at each node are fixed at some value L, regardless of the tapping ratio T. This describes typical commercial devices, i.e., L=0.023 (0.1 dB loss) for a good fused coupler.

Taking the first derivative of the "tapped power equation" and setting to zero yields an optimal value for T:

$$T_{opt} = (1 - L)/N.$$

Therefore, $$[P_{tN}]_{opt} = P_0(1 - L)^N(1 - 1/N)^{N-1}/N$$

or in dB, $[P_{tN}]_{opt}(dBm) = P_0(dBm) + (N-1)10log(1 - 1/N) + Nlog(1 - L) + 10log1/N$ Case II. Assume that the losses at each node are proportional to the tapping ratio (L=aT), as is the case with the integrated fiber-optic tap. Substituting aT for L in the power at the last station is $$P_{tN} = P_0[1 - (a+1)T]^{N-1} T.$$

Optimizing with respect to T results in:

$$T_{opt} = 1/(a+1)N$$

and $$[P_{tN}]_{opt} = P_0(1 - 1/N)^{N-1}/(a+1)N,$$

or in dB, $[P_{tN}]_{opt}(dBm) = P_0(dBm) + (n-1)10log(1 - 1/N) + 10log(1/(a+1)) + 10log(1/N).$ The property of proportionality between loss fraction and tapping ratio constitutes a fundamental difference between the integrated fiber-optic tap and conventional taps such as fused couplers. Comparison of the case of proportional loss, and the case of fixed loss, with the ideal case, highlights the advantage of the integrated fiber-optic tap: the case of fixed loss differs from the ideal case by a factor of $10Nlog(1-L)$, which grows with order N, while the case of proportional loss differs from the ideal case by a factor of $10log(1/a+1)$, independent of N. The contrast is marked by system performance when N is large (greater than 100), as illustrated in FIG. 3. When L does not equal zero and is fixed, the system performs closely to the ideal case for N small, but deviates drastically as the accumulation of losses becomes prohibitively large for N greater than 100. When losses are proportional to tapping ratios, the system performance parallels the ideal case regardless of the number of stations and the impact of excess loss is muted; for a tap efficiency of 50%(a=1), power is down 3 dB from the ideal case; for an efficiency of 33%(a=2), power is down only 5 dB. As illustrated in FIG. 3, this becomes very important for N greater than 100.

Figure 4:
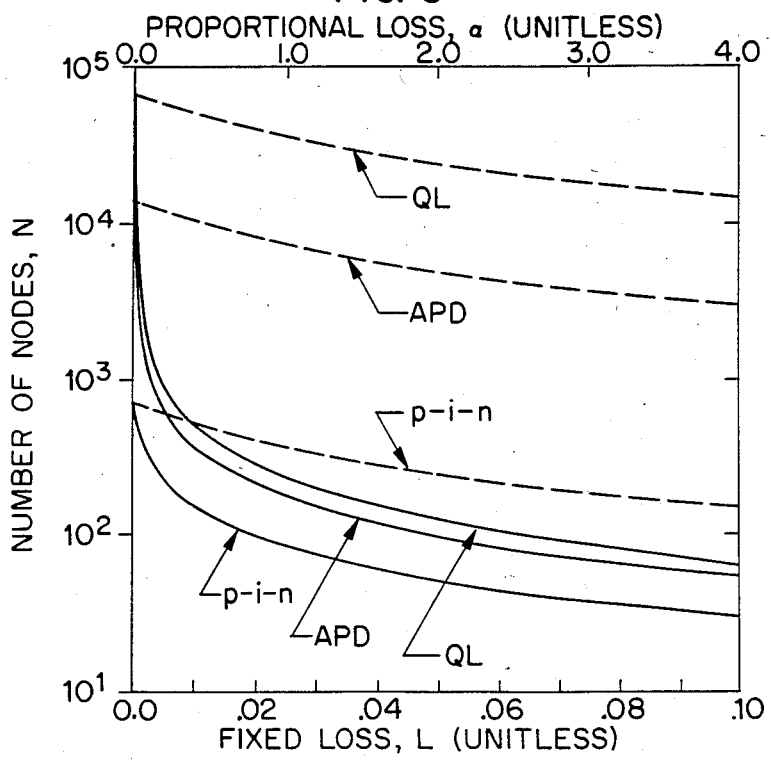
FIG. 4 is a graph showing the number of nodes N which can be concentrated as a function of loss assuming that the minimum detectable power is tapped at the last node N. The fixed loss case (solid lines) and the proportional loss case (broken lines) are shown for the tree classes of detectors the p-i-n photodetector, the APD, and the quantum limited detector.

Although loss considerations indicate that an arbitrarily large number of taps may be cascaded on the bus given an arbitrarily small $T_{opt}$, there is a limit for N dictated by the minimum detectable power of the photodetectors. For an optical wavelength of 850 nm, a bit error rate of $10^{-9}$, and a transmission rate of 500 Mb/s, the minimum detectable power is found for three general classes of detectors:

p-i-n photodiode: 489 nW or −33 dBm
avalanche photodetector: 24 nW or −46 dBm
quantum limited detector: 5 nW or −53 dBm The maximum number of stations is determined by replacing $[P_{tN}]_{opt}$ with the minimum detectable power in equations above and solving for N. FIG. 4 illustrates the significant difference between a conventional fixed loss tap and an integrated fiber-optic tap according to the invention with respect to maximum allowable number of nodes. Although the two horizontal axes of FIG. 4, a and L, have no direct relation, they both span reasonable ranges for comparative purposes: fixed losses range from zero to 10%, and loss proportionally, a, ranges from zero to 4 (corresponding to a tap efficiency of 20%). For the ideal case of zero loss both types of taps converge to the same limit. However, for non-zero losses the number of nodes supported by the integrated fiber-optic tap decreases slowly while the number of nodes supported by the fixed loss tap decreases rapidly.

The photodetector responsivity is lower than expected for a silicon p-n junction by one or two orders of magnitude. One reason for this appears to be related to the surface spin-on technique used to fabricate the junction. This method of impurity deposition is probably not optimal for the particular cylindrical well or cavity geometry and probably results in a junction depth which narrows substantially with well depth. The shallow junction depth and the large absorption length of 830 nm light would certainly account for the poor responsivity.

Since the detector fabrication may be compatible with standard integrated circuit processing, the detector's associated circuitry, such as a preamplifier and filters, could be located on the chip in close proximity to the well or cavity. This would likely alleviate the effects of the EMI and electronic cross-talk associated with sending a small photocurrent across lengths of wire, and take full advantage of the tap's integrated structure.

In summary, the use of cladding modes in a single-mode fiber for optical tapping has been shown to exhibit tapping ratios as high as 36 dB, and holds the potential of exhibiting tapping ratios limited only by the fiber's intrinsic loss. Excess loss on par with the best commercially available devices is obtainable (0.07 dB loss). The property of loss proportional to tapping ratio allows the present invention to be employed to support significantly more stations on a continuous, repeaterless bus than conventional, fixed loss devices. For a large number of stations, the amount of tapped power at the last in a series of N stations decreases with order N for the case of fixed losses, but decreased independent of N for the case of proportional losses.

The ability to easily control and adjust the tapping ratio allows an optical bus to be expanded in situ without forfeiting optimal tapping ratio. An active tap, one which can be turned on or off by electro-mechanical control of the microbending mechanism (by a piezoelectrical device, e.g.), is also possible, as well as a tap which can be dynamically adjusted to account for changing network conditions.

The implementation of this tapping technique via the novel integration of photodetector and fiber tap provides mechanical stability and compatability with current integrated circuit technology. The processes involved in fabricating this device do not hinder the use of standard circuit processing techniques. This compatability may provide for the assimilation of this device into large VLSI multiprocessor systems as the means for optical distribution of timing signals. The integrated fiber-optic tap may also be useful as a receiver for optical interconnection between chips, particularly in micro-area networks.(10) The large number of stations which can be supported by a bus incorporating this device makes its use in high bandwidth broadcast networks, such as digital video broadcasting, also particularly appealing.

Although a preferred embodiment of the invention has been disclosed and described herein, it should be understood that the present invention is in no sense limited thereby and its scope is to be determined by that of the appended claims.

REFERENCES

[1] Malcolm H. Hodge and James A. Moras, "A Hard Clad Silica Fiber Multi-Tap Bus System," presented at FOC LAN '86, Orlando, Fla. (1986).

[2] P. K. Bhattacharya, W-Q.Li, and D. A. Weinberger, "On-Chip Activation of Superlattice Detectors via Light Coupled Out Laterally from Optical Fibers," Electronics Letters, 22 (21), 1107–1108 (1986).

[3] D. J. Ehrlich, R. M. Osgood, Jr., and T. F. Deutsch, "Laser chemical technique for rapid direct writing of surface relief in silicon," Applied Physics Letters, 38 (12), 1018–1020 (1981)

[4] Paul R. Prucnal, Eric R. Fossum, and Ricahrd M. Osgood, "Integrated fiber-optic coupler for very large scale integration interconnects," Optics Letters, 11 (2), 109–111 (1986).

[5] Dietrich Marcuse, "Microdeformation losses of single-mode fibers," Applied Optics, 23 (7), 1082–1091 (1984).

[6] D. Marcuse, "Coupled power equations for loss fibers," Applied Optics, 17 (20), 3232–3237 (1978).

[7] Henry F. Taylor, Bending Effects in Optical Fibers," Journal of Lightwave Technology, LT-2 (5), 617–628 (1984).

[8] S. K. Yao, C. K. Asawa, and G. F. Lipscomb, "Microbending loss in a single-mode fiber in the pure-bend regime," Applied Optics, 21 (17), 3059–3060 (1982).

[9] Dietrich Marcuse, "Coupled Power Theory," in Theory of Optical Waveguides, chapter 5, Academic Press, N.Y. (1974).

[10] Paul R. Prucnal, "Optical Interconnects for VLSI Local Area Networks," IEEE Electrotechnology Review, Vol. 2 pp. 97–99 (1986).

What we claim is:

1. A passive optical tap for a single-mode optical fiber for optically transferring optical information from a source optically connected to said fiber to a light detector which comprises:
    means for inducing cladding modes within the fiber;
    detector means for converting light into an electrical signal;
    means for optically coupling the fiber to said detector means to couple energy from the induced cladding modes to the detector means, wherein the means for optically coupling comprises notch means formed in the fiber.

2. A passive optical tap as defined in claim 1, wherein the means for optically coupling comprises a reduced diametrical notch formed in the fiber.

3. A passive optical tap as defined in claim 2, wherein the notch is circularly symmetrical.

4. A passive optical tap as defined in claim 2, wherein the means for inducing cladding modes comprises a microbender.

5. A passive optical tap as defined in claim 2, wherein the microbender comprises a mode-scrambler which induces cladding modes and causes redistribution of the cladding modes into a steady state modal distribution.

6. A passive optical tap as defined in claim 1, wherein the detector means for converting light comprises an integrated photodetector.

7. A passive optical tap as defined in claim 6, wherein the detector means for converting light comprises a p-n junction detector.

8. A passive optical tap as defined in claim 2, including a semiconductor wafer having a cavity etched from one surface of the wafer to another surface of the wafer, and wherein said fiber is received to pass through said cavity.

9. A passive optical tap as defined in claim 8, wherein the semiconductor wafer is a silicon wafer and the electroconductive metal is aluminum.

10. A passive optical tap as defined in claim 8, wherein an electroductive metal is deposited on the surface of the wafer around the opening of the cavity.

11. A passive optical tap as defined in claim 10, wherein the semiconductive wafer is gallium arsenide, and the electroconductive metal is gold germanium.

12. A passive optical tap as defined in claim 2, wherein the cladding of the fiber is chemically etched away to form the notch.

13. A passive optical tap as defined in claim 1, wherein the fiber has a glass core diameter of about 4 um and an outside (cladding) diameter of about 80 um.

14. A passive optical tap as defined in claim 2, wherein the fiber has a glass core diameter of about 4 um and an outside (cladding) diameter of about 80 um and a notch depth of about 20 um.

15. A passive optical tap as defined in claim 4, wherein the microbender includes means for adjusting the extent of microbend in the fiber.

16. A passive optical tap as defined in claim 8, wherein the detector means comprises a p-n junction detector formed on the inside surface of the cavity.

17. A passive optical tap for a single-mode optical fiber for optically transferring optical information from a source optically connected to said fiber to a light detector, which comprises:
   a semiconductor wafer having a cavity etched from one surface of the wafer to another surface of the wafer;
   detector means for converting light into an electrical signal, comprising a p-n junction detector on the inside surface of the cavity, and wherein an electroconductive metal is deposited on the opening of the cavity in electrical contact with the p-n junction;
   microbender means for inducing cladding modes within the fiber;
   optical coupling means for optically coupling the fiber to said detector means to couple energy from the induced cladding modes to the detector means, said optical coupling means comprising a reduced diametrical notch formed in the fiber said fiber notch being located in said wafer cavity.

* * * * *